(12) United States Patent
Morino et al.

(10) Patent No.: US 6,400,401 B1
(45) Date of Patent: *Jun. 4, 2002

(54) CAMERA CONTROL METHOD AND APPARATUS, AND NETWORK SYSTEM OF CAMERA CONTROL APPARATUS

(75) Inventors: Takashi Morino; Hiroshi Okazaki, both of Yokohama; Makoto Murata, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/563,704

(22) Filed: Nov. 28, 1995

(30) Foreign Application Priority Data

Nov. 29, 1994 (JP) .............................................. 6-294691

(51) Int. Cl.⁷ ................................................ H04N 5/232
(52) U.S. Cl. ....................................... 348/211; 348/143
(58) Field of Search ................................ 348/211, 212, 348/213, 333, 334, 335, 341, 143, 169, 13, 14, 15, 552; 345/17; H04N 5/225

(56) References Cited

U.S. PATENT DOCUMENTS

| | | | | |
|---|---|---|---|---|
| 4,224,615 A | * | 9/1980 | Penz | 345/173 |
| 4,516,156 A | | 5/1985 | Fabris et al. | |
| 5,396,287 A | * | 3/1995 | Cho | 348/211 |
| 5,426,732 A | * | 6/1995 | Boies et al. | 395/349 |
| 5,479,206 A | * | 12/1995 | Ueno et al. | 348/211 |
| 5,568,183 A | * | 10/1996 | Cortejens et al. | 348/211 |
| 5,764,276 A | * | 6/1998 | Martin et al. | 348/13 |

\* cited by examiner

*Primary Examiner*—Tuan Ho
(74) *Attorney, Agent, or Firm*—Morgan & Finnegan, LLP

(57) ABSTRACT

A method of controlling a camera capable of being moved in prescribed directions that differ from one another includes a display step of displaying an image, which has been captured by the camera, on display device having a display screen area divided into a plurality of zones, with a direction of movement of the camera being assigned to each of the zones; a designating step of designating a prescribed position in the display screen area; and a moving step of moving the camera in the direction of movement that has been assigned to whichever zone corresponds to the position designated at the designating step.

65 Claims, 7 Drawing Sheets

CAMERA CONTROL METHOD AND APPARATUS, AND NETWORK SYSTEM OF CAMERA CONTROL APPARATUS

BACKGROUND OF THE INVENTION

This invention is ideal for use in camera control for a case where a computer, to which a camera apparatus capable of being subjected to panning, tilting and zooming control is connected, as well as other computers on a network, remotely controls the camera apparatus. This art can be applied to desktop video conferences, surveillance cameras and the like.

A method of camera control in a video conference system or system of surveillance cameras using camera apparatus whose panning, tilting and zooming operations are capable of being controlled is as shown in FIG. 1. Specifically, a control panel window (hereinafter referred to as a "control window") 54 for controlling the state of a camera apparatus (not shown) is displayed on a screen 50a of a display unit 50. This window is separate from a motion-picture window 52 which displays a motion image obtained from the camera apparatus. Panning, tilting and zooming can be controlled by using a mouse (not shown) or the like to operate the control window 54.

In a case where the motion-picture display window 52 and control window 54 are presented separately on the screen 50a of the display unit 50 in a video conference system or surveillance camera system based upon use of a computer, it is difficult to view both of the windows 52, 54 simultaneously. Accordingly, one's view direction is directed toward either of the windows when the state of the camera apparatus is controlled. If view of direction is directed toward the motion-picture window 52, mistakes tend to be made in terms of operating the control window 54. If view of direction is directed toward the control window, it is very difficult to perform control so as to make the camera follow up the motion of a human being or the like.

SUMMARY OF THE INVENTION

Accordingly, an object of the present invention is to provide a control system for controlling a camera apparatus in which it is possible to control the operation of the camera apparatus in simple fashion merely by directing one's view of direction toward one window and not other windows.

Another object of the present invention is to improve the operability of control for moving the camera apparatus.

According to the present invention, the foregoing objects are attained by providing a camera capable of being moved in prescribed directions that differ from one another, comprising display means for displaying an image picked up by the camera; the display means having a display screen area divided into a plurality of zones, with a direction of movement of the camera being assigned to each of the zones; designating means for designating a prescribed position in the display screen area; and moving means for moving the camera in the direction of movement that has been assigned to whichever zone corresponds to the position designated by the designating means.

Further, the foregoing objects are attained by providing a method of controlling a camera capable of being moved in prescribed directions that differ from one another, comprising: a display step of displaying an image, which has been picked up by the camera, on display means having a display screen area divided into a plurality of zones, with a direction of movement of the camera being assigned to each of the zones; a designating step of designating a prescribed position in the display screen area; and a moving step of moving the camera in the direction of movement that has been assigned to whichever zone corresponds to the position designated at the designating step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail with reference to the drawings.

First Embodiment

Figure 1:
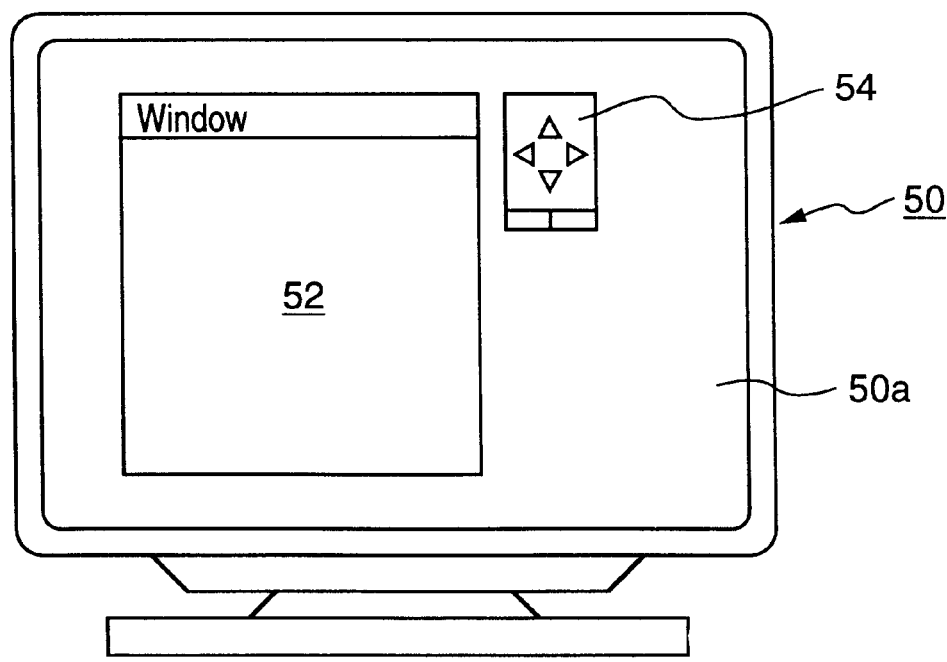
FIG. 1 is a diagram illustrating an example of the prior art.
Figure 2:
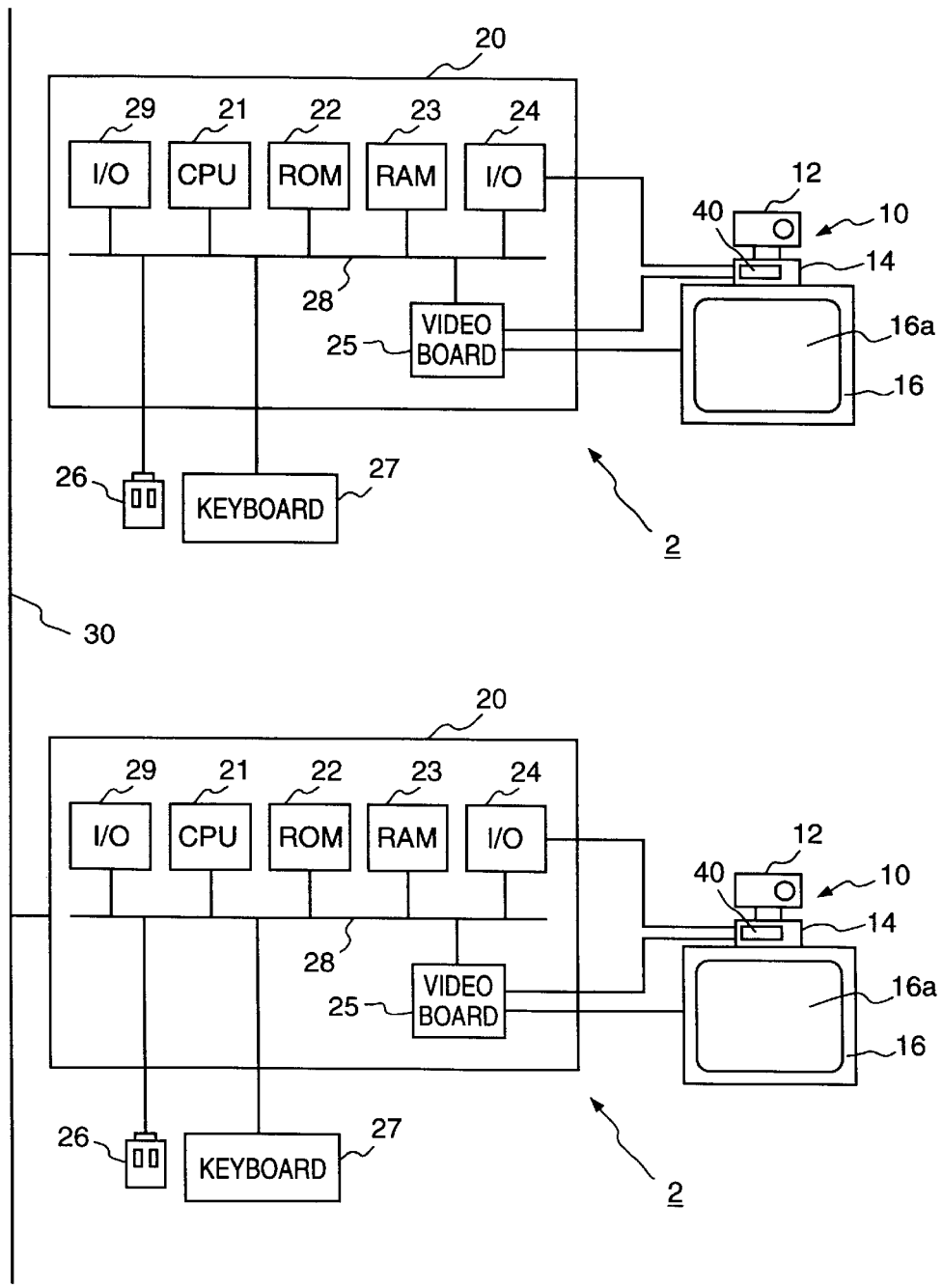
FIG. 2 is a block diagram showing the configuration of a first embodiment of the present invention.

FIG. 2 is a block diagram illustrating the general configuration of a camera control apparatus 2 according to a first embodiment of the present invention. A camera apparatus 10 includes a camera unit 12 capable of capturing the image of a subject and of performing a zooming operation, and a panning head 14 capable of controlling the attitude (rotational movement) of the camera unit 12 in a panning direction (to the left and right in FIG. 2) and tilting direction (up and down in FIG. 2). A display unit 16 has a display screen 16a on which the image accepted by the camera unit 12 is capable of being displayed. A work station 20 is equipped with a CPU 21, a ROM 22, a RAM 23, input/output units 24, 29 and a video board 25 for the purpose of issuing instructions to control the state of the camera unit 10 (its positions in the panning and tilting directions and its position in the zooming direction) and for causing the display unit 16 to display the image information accepted by the camera unit 10. A mouse 26 serving as a pointing device and a keyboard 27 are connected to the work station 20 in order to enter data. In this embodiment, the mouse 26 and keyboard 27 function as means for designating various types of processing. These elements are interconnected via a bus 28. The CPU 21 controls the camera control apparatus 2. The program executed by the CPU 21 to control the apparatus is stored in the ROM 22, and various data are stored in the RAM 23. The input/output unit 24 outputs a camerastatus control signal, which is issued by the CPU 21, to the camera apparatus 10 and enters values indicating various states of the camera apparatus 10 from the camera apparatus 10. The input/output unit 24 in this embodiment is connected to the camera apparatus 10 via an RS232C. The video board 25 sends the display unit 16 image information obtained from the camera apparatus 10. The video board 25 in this embodiment converts an NTSC signal to an RGB format and outputs the RGB signal.

A plurality of the camera control apparatuses 2 are capable of being connected via a network 30 and signals can be sent and received by the input/output units 29 via the network. Depending upon the configuration, a so-called video conference can be implemented. Though a work station is utilized as the control apparatus in this embodiment in view of the universality and processing capability of a work station, it goes without saying that a personal computer may be utilized or that use may be made of a special-purpose control apparatus.

Figure 3A:
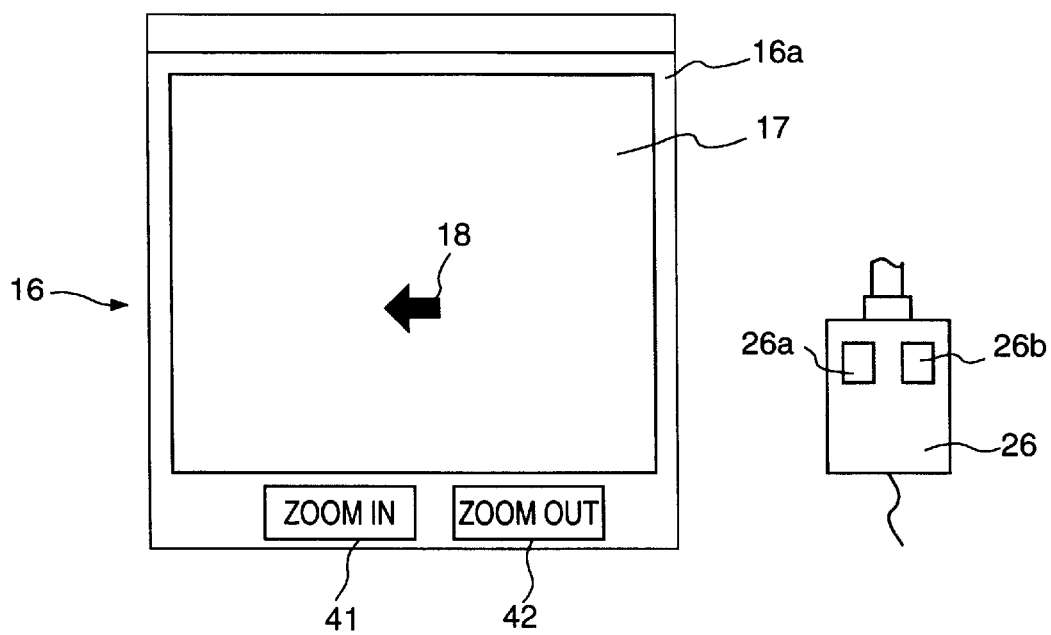
FIG. 3A is an explanatory view illustrating a display on a screen according to the first embodiment.
Figure 3B:
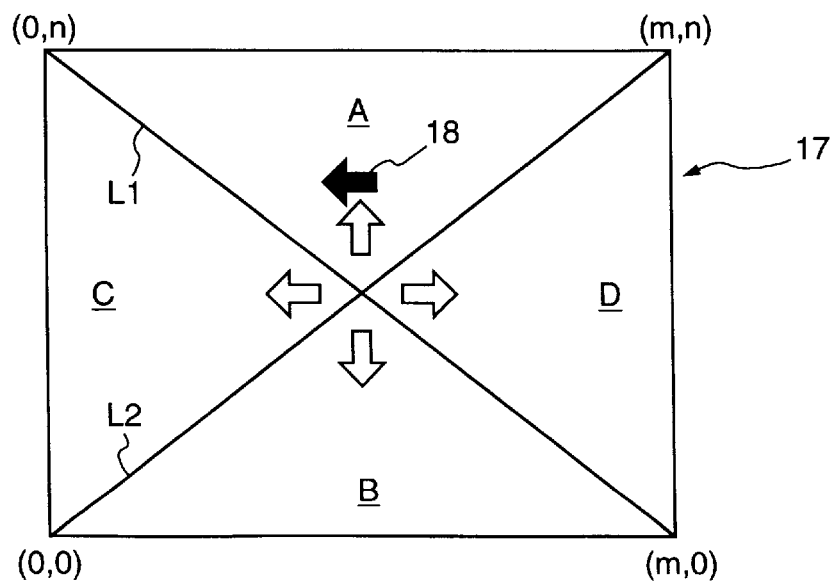
FIG. 3B is a diagram showing the manner in which a screen is divided.

FIGS. 3A and 3B are diagrams for describing the method of camera control according to this embodiment. FIG. 3A illustrates the display unit 16 and the mouse 26, and FIG. 3B depicts the screen of the display unit 16. In this embodiment, the motion-picture window 17 on the screen 16a in FIG. 3A is divided into four zones by two diagonal lines L1, L2, as shown in FIG. 3B, to construct a GUI (Graphical User Interface) for controlling the camera apparatus 10. The camera apparatus 10 is controlled in conformity with the zone in which a mouse cursor 18 is situated and the operation of buttons 26a, 26b of mouse 26. It is possible to move the camera apparatus 10 in the direction of the arrow illustrated in each zone. Zones A and B are used to designate tilting motion and zones C and D are used to designate panning motion. More specifically, zones A, B, C and D in FIG. 3B make it possible to move the image pick-up direction of the camera apparatus 10 up, down, left and right, respectively. It should be noted that the characters indicated in each of the zones are attached to facilitate explanation and are not actually displayed on the screen. The arrows and diagonal lines L1, L2 also are not displayed. Since the divided zones are sufficiently large, pointing to an approximate position with the cursor makes it possible to designate the corresponding zone even through the boundaries of the divided zones are not displayed.

Figure 4:
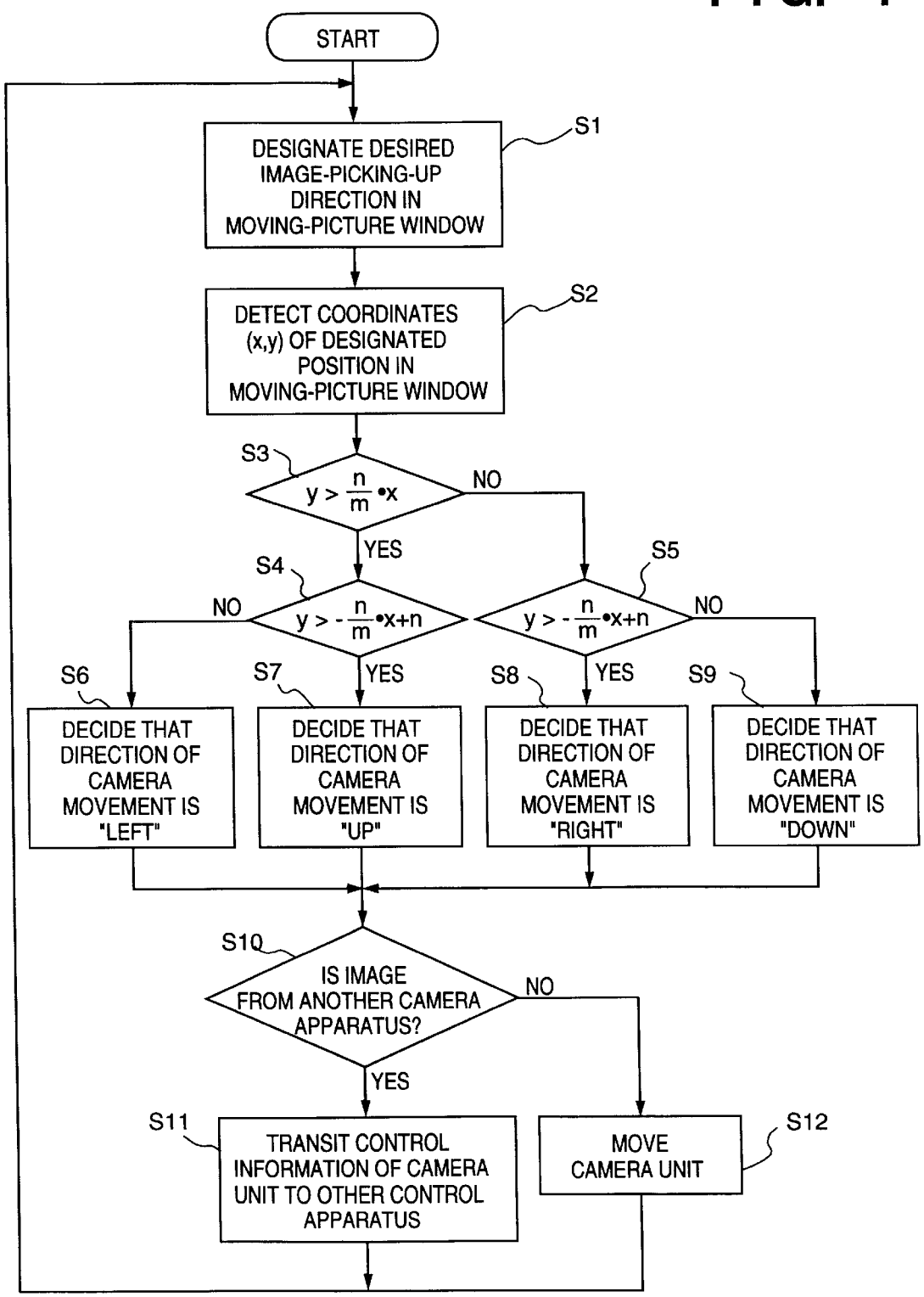
FIG. 4 is a flowchart for describing the operation of the first embodiment.

The processing operation according to this embodiment will be described with reference to FIG. 4, which is a flowchart of the processing operation. In the description below, it will be assumed that an image captured by the camera is being displayed in the motion-picture window 17.

First, at step S1, the operator manipulates the mouse 26 to move the cursor 18 on the motion-picture window 17 and presses the first button 26a to select any one of the zones A, B, C, D, thereby designating the direction in which image pick-up is desired, namely the direction in which the camera unit 12 is desired to be moved.

The CPU 21 senses the coordinates (x,y) of the position of cursor 18 at step S2. The coordinates (x,y) are stored in the RAM 23.

The CPU 21 determines, at steps S3, S4 and S5, which zone in the motion-picture window 17 is the zone that has been designated. This processing will be described later in greater detail. In FIG. 3B, let the lower left-hand corner of the motion-picture window 17 be the origin (0,0), and consider that the motion-picture window 17 is a plane having a size m along the x axis and n along the y axis. The equation of the diagonal line L1 is y=−(n/m)x+n, and the equation of diagonal line L2 is y=(n/m)x. Therefore, the zones delimited by the diagonal lines L1 and L2 are expressed by the following limits: zone A: y>(n/m)x, y>−(n/m)x+n; zone B: y≦(n/m)x, y≦−(n/m)x+n; zone C: y>(n/m)x, y≦−(n/m)x+n; zone D: y≦(n/m)x, y>−(n/m)x+n. Accordingly, it is determined at step S3 whether y>(n/m) holds. If the decision rendered at step S3 is "YES", the program proceeds to step S4, at which it is determined whether y >−(n/m)x+n holds. If the decision rendered at step S3 is "NO", the program proceeds to step S5, at which it is determined whether y>−(n/m)x+n holds. Thus, it can be determined which zone is the zone that has been designated by the operator.

If "YES" decisions are rendered at both steps S3 and S4, then it is judged that the zone A has been designated (step S7).

If a "YES" decision is rendered at step S3 and a "NO" decision at step S4, then it is judged that the zone C has been designated (step S6). If a "NO" decision is rendered at step S3 and a "YES" decision at step S4, then it is judged that the zone D has been designated (step S8). If "NO" decisions are rendered at both steps S3 and S4, then it is judged that the zone B has been designated (step S9).

When the direction in which the camera is to be moved has been determined by the processing described above, the CPU 21 determines at step S10 whether the source providing the image information displayed in the motion-picture window 17 is the camera of another camera control apparatus or the camera which the CPU 21 itself is controlling. In the former case, the program proceeds to step S11, at which the CPU 21 sends a camera control signal to the other camera control apparatus via the input/output unit 29 and the network 30. In the latter case, namely the case in which the camera apparatus is the camera apparatus 10 connected to the CPU's own work station, the program proceeds to step S12, at which the CPU 21 sends the control signal to the panning head 14 via the input/output unit 14.

By repeating the processing of steps S1~S11 described above, the image of any subject situated within the range capable of being picked up by the camera apparatus under control can be captured and the captured image can be formed in the motion-picture window 17. It should be noted that the processing according to this embodiment is capable of accepting an interrupt. When a series of processing operations ends, the interrupt is generated and processing is terminated. Icons 41, 42 (see FIG. 3A) for zooming operations are separately provided so that zooming can be designated on the screen 16a. In this case, zooming-in toward the telephoto side (enlargement) can be performed by using the mouse 26 to designate the icon 41, and zooming-out toward the wide side (reduction) can be performed by using the mouse 26 to designate the icon 42.

In this embodiment, the motion-picture window 17 is divided by the diagonal lines L1, L2 and therefore the zones that can be designated are formed vertically and horizontally. This coincides with the directions in which the camera is operated and is easy to understand visually, thereby improving operability.

Second Embodiment

In the first embodiment, the motion-picture window 17 is divided into four zones to make it possible to control the state of the camera apparatus 10. In the second embodiment illustrated below, the window 17 is divided into nine zones to perform control. This will now be described with reference to FIGS. 5 and 6.

Figure 5:
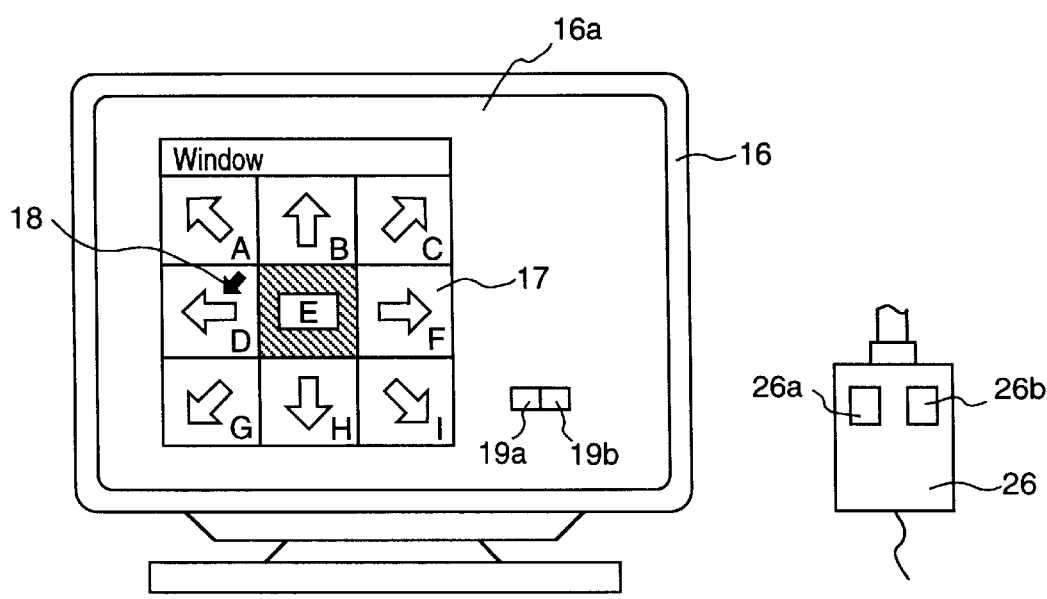
FIG. 5 is an explanatory view illustrating a display on a screen according to a second embodiment.

FIG. 5 is a diagram for describing the method of camera control. According to this embodiment, the motion-picture window 17 on the screen 16a is divided into nine zones (namely three zones horizontally by three zones vertically) to construct a GUI for controlling the camera apparatus 10. The camera apparatus 10 is capable of being controlled in conformity with the zone in which a mouse cursor 18 is situated and the operation of the buttons 26a, 26b of mouse 26. It is possible to move the camera apparatus 10 in the directions of the arrows illustrated in the respective zones. Zones D and F are used to designate panning motion; zones B and H to designate tilting motion; and zones A, C, G and I to designate panning motion and tilting motion simultaneously. Zone E is used to designate zooming of the camera apparatus 10. In FIG. 5, arrows are illustrated in the respective zones in the motion-picture window 17 so as to facilitate the description of this embodiment. In actuality, however, the arrows are not displayed since doing so would detract from the appearance of the moving picture displayed. The fact that the arrows are not displayed causes almost no inconvenience because the boundaries of the zones are clearly displayed. It is possible to display the arrows in a semi-transparent manner, however, by lowering the luminance of the arrow character information and mixing this information with the image information. In such case the moving picture will become somewhat more difficult to see but it will be unnecessary to display the zone boundaries since it will suffice for the operator to indicate the vicinity of an arrow using the cursor 18. By displaying arrow-display selection icons 19a, 19b and selecting either icon, it is possible to switch between a mode in which the arrows are displayed and a mode in which the arrows are not displayed.

Figure 6:
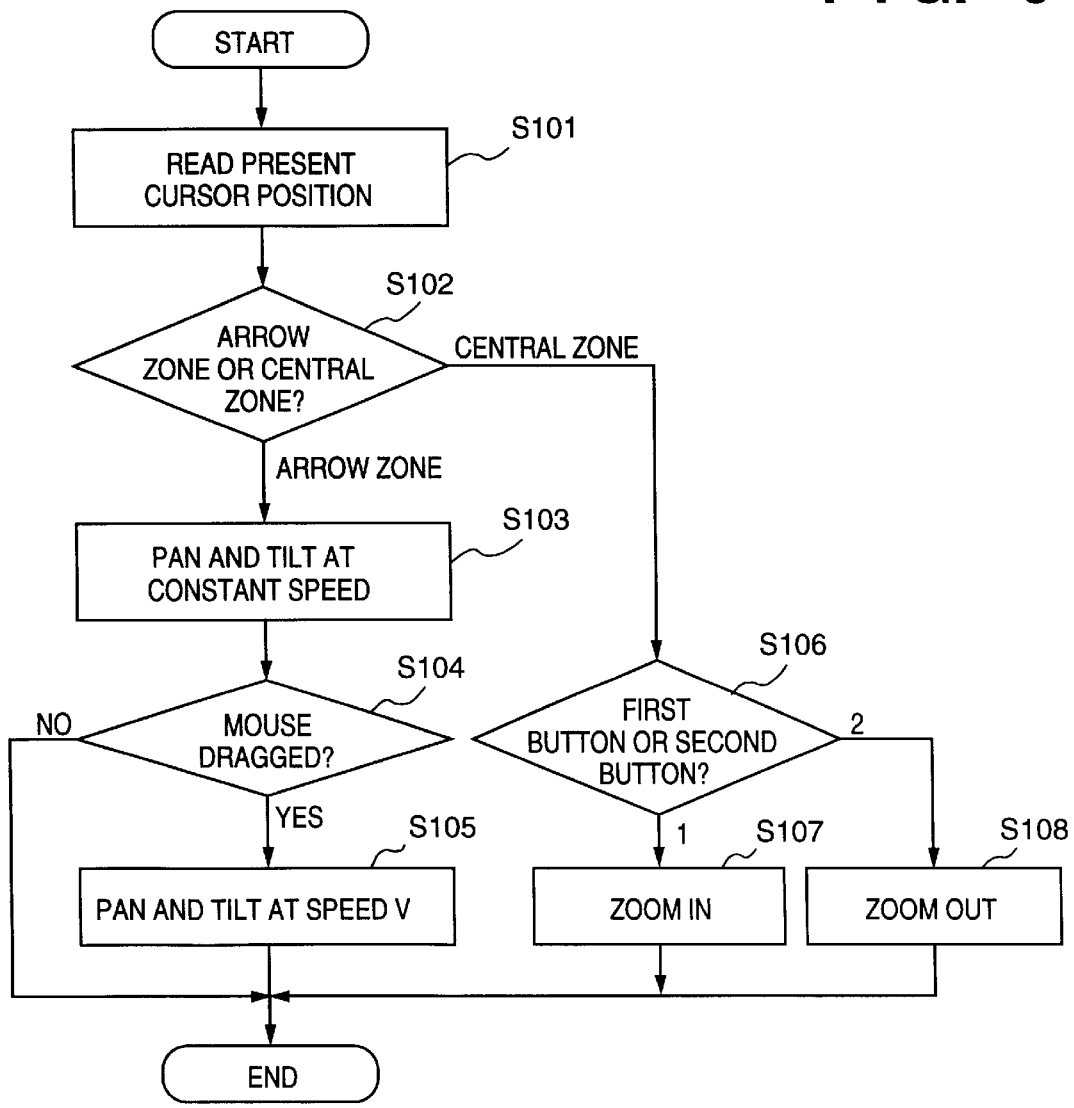
FIG. 6 is a flowchart for describing the operation of the second embodiment.
Figure 7:
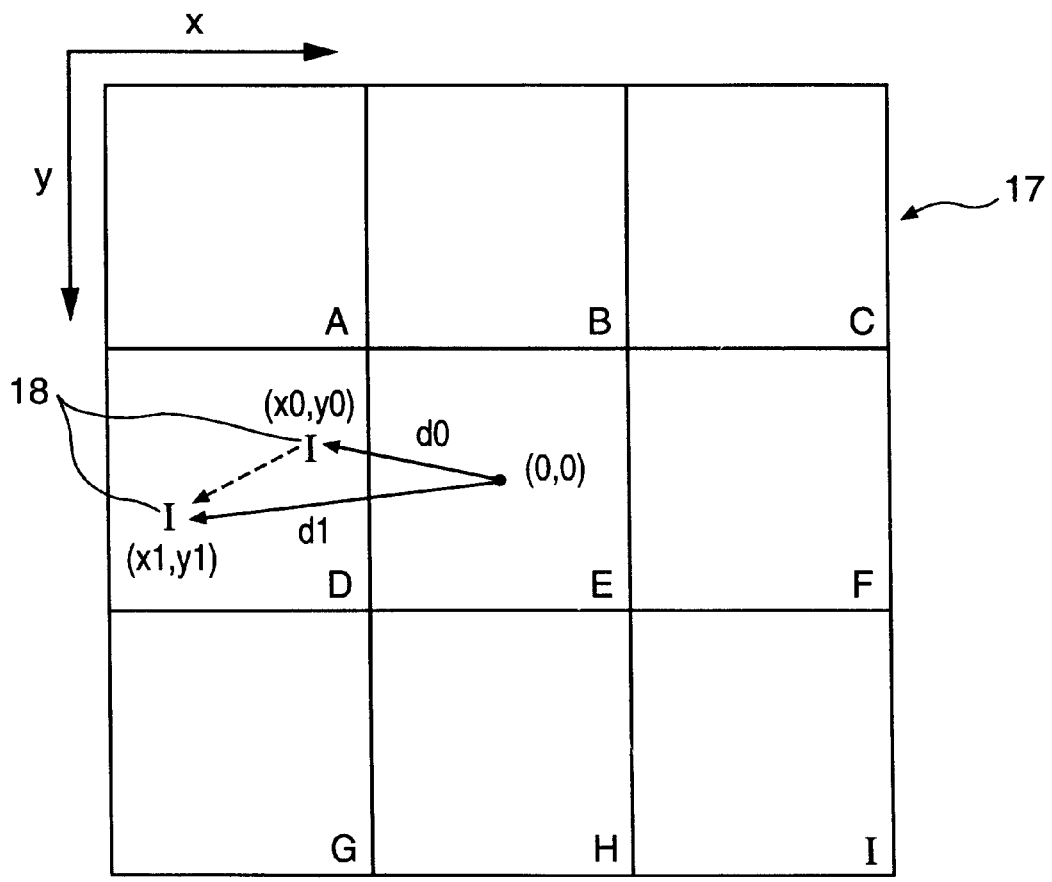
FIG. 7 is a diagram for describing the second embodiment.

The operation of this embodiment will now be described with reference to FIGS. 6 and 7. FIG. 6 is a flowchart illustrating the processing operation of this embodiment, and FIG. 7 is a diagram for describing operation. The operation described below is controlled by the CPU 21.

When the first button 26a of mouse 26 is pressed for the purpose of controlling the state (position) of the camera apparatus 10, the positional coordinates (x0,y0) of the cursor 18 displayed in the motion-picture window 17 are read (step S101). The read values are saved in the RAM 23.

Next, it is determined in which zone of the nine divided zones the read coordinates (x0,y0) reside (step S102). This can be carried out by a method similar to that used to judge the zone in the first embodiment.

In a case where the first button 26a of mouse 26 is pressed when the cursor 18 resides in any one of the zones A, B, C, D, F, G, H, I, as shown in FIG. 7, the camera is moved at a predetermined velocity Vconst in the direction corresponding to the direction of the arrow in this zone in the motion-picture window of FIG. 5 (step S103). For example, in a case where the zone D in FIG. 7 has been designated, the camera unit 12 is moved (panned) to the left.

Furthermore, the CPU 21 determines whether the mouse 26 has been dragged (moved) (step S104). In a case where the mouse 26 has been dragged to move the cursor 18 to the position (x1,y1), the CPU 21 calculates the distance d0 from the center coordinates (0,0) of the motion-picture window 17 to the initial position (x0,y0) of the cursor 18 as well as the distance d1 from (0,0) to the position (x1,y1) to which the cursor has been moved. The camera unit 12 is moved at a velocity V, which is obtained using the following equation, proportional to the ratio d0/d1 (step S5):

$$V = C \times V_{const} \times d0/d1 \qquad (1)$$

where C represents a constant.

According to this moving operation, the velocity V increases the farther the cursor 18 is moved from the center coordinates (0,0) of the motion-picture window 17 by dragging the mouse and decreases the closer the cursor 19 is moved to center coordinates (0,0) by dragging the mouse. Accordingly, the speed at which the camera unit 12 is moved (rotated) can be changed with ease. This movement of the camera unit 12 continues as long as the first button 26a of the mouse 26 is being pressed. The movement of the camera unit 12 is carried out by transmitting an instruction, which has been issued by the CPU 21, to a drive circuit 40 built in the panning head 14. This instruction is transmitted via the bus 28 and input/output unit 24.

In a case where a button on the mouse 26 is pressed when the cursor 18 resides in zone E, the CPU determines whether the pressed button is the first button 26a or the second button 26b (step S106).

Zooming in is performed (step S107) when the first button 26a is pressed and zooming out is performed (step S108) when the second button 26b is pressed. This zooming operation continues as long as the button on the mouse 26 is being pressed.

Thus, in accordance with the second embodiment, operations for panning, tilting and zooming the camera unit 12 can be performed with ease by designating predetermined zones on the window. The window is divided into nine zones. The central zone is made to correspond to a designation for zooming the camera, the zones above and below the central zone are assigned to the tilting direction, and the zones to the left and right of the central zone are assigned to the panning direction. The zones at the corners of the window are assigned to a combination of tilting and panning directions. As a result, the zones can be made to coincide to the operating directions of the camera. This is easy to understand visually, thereby improving operability.

In addition, the speed at which the camera unit 12 is moved (rotated) can be changed with ease.

Operation in the first embodiment can be improved as well by providing the central portion of the motion-picture window 17 with the zone for designating the zooming operation.

Since a separate control window need not be specially provided, the screen of the display unit can be utilized effectively.

Thus, as will be evident from the foregoing description, the operation of a camera apparatus can be controlled in simple fashion merely by directing one's line of sight toward one window and not other windows.

In addition, the zones obtained by dividing the window can be made to coincide to the operating directions of the camera apparatus. This is easy to understand visually, thereby improving operability.

In the embodiments described above, the motion-picture window is divided into a plurality of zones. However, it goes without saying that the entirety of the display screen may be divided into a plurality of zones in a similar manner. Further, the display screen in the foregoing embodiments is the screen of a display unit that is separate from the camera. However, the screen may be picture screen in the viewfinder of the camera. In such case a detecting unit would be provided to detect the line of sight of the user looking at the viewfinder. In such an arrangement, the line of sight would be detected and the point of intersection between the line of sight and the picture screen of the viewfinder would be adopted as the designated position.

Other Embodiments

The present invention can be applied to a system constituted by a plurality of devices (e.g., work station 20, 16 display unit, camera unit, panning head) or to an apparatus comprising a single device.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part of entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for controlling a camera capable of being moved in prescribed directions that differ from one another, comprising:

display means for displaying an image picked up by the camera, said display means being divided into a plurality of zones, each of said zones displaying a partial image of the image picked up by the camera, and each of said zones being assigned with a direction of movement of the camera;

designating means for designating a desired position in the image displayed by said display means, by an operation of a mouse; and moving means for moving the camera in the direction of movement that has been assigned to the zone corresponding to the position designated by said designating means, wherein said moving means controls a panning of the camera for a time proportional to a period while a button of the mouse is pressed.

2. The apparatus according to claim 1, wherein the image picked-up by the camera is displayed in a window area on a display screen.

3. The apparatus according to claim 2, wherein said window area is divided into a plurality of zones and directions of upward movement, downward movement, leftward movement and rightward movement are assigned to respective ones of the zones.

4. The apparatus according to claim 3, wherein the direction of leftward movement is assigned to a zone on the left side of said window area, the direction of rightward movement is assigned to a zone on the right side of said window area, the direction of upward movement is assigned to a zone on the upper side of said window area, and the direction of downward movement is assigned to a zone on the lower side of said window area.

5. The apparatus according to claim 2, wherein a zone for designating zooming of the image is further assigned to said window area.

6. The apparatus according to claim 5, wherein a zone for designating zooming of the image is assigned to a central zone of said window area.

7. The apparatus according to claim 5, wherein said moving means zooms the camera if the zone for designating zooming of the image is designating by said designating means.

8. The apparatus according to claim 2, wherein said window area is divided into a plurality of zones and directions of upward movement, downward movement, leftward movement, rightward movement, upper leftward movement, lower leftward movement, upper rightward movement and lower rightward movement are assigned to respective ones of the zones.

9. The apparatus according to claim 8, wherein a zone for designating zooming of the image is further assigned to said window area.

10. The apparatus according to claim 9, wherein the direction of leftward movement is assigned to a zone on the left side of said window area, the direction of rightward movement is assigned to a zone on the right side of said window area, the direction of upward movement is assigned to a zone on the upper side of said window area, the direction of downward movement is assigned to a zone on the lower side of said window area, the direction of the upper leftward movement is assigned to a zone on the upper left side of said window area, the direction of the lower left movement is assigned to a zone on the lower left side of said window area, the direction of said upper rightward movement is assigned to a zone on the upper right side of said window area, and the direction of lower rightward movement is assigned to a zone on the lower right side of said window area.

11. The apparatus according to claim 9, wherein a zone for designating zooming of the image is assigned to a central zone of said window area.

12. The apparatus according to claim 2, wherein said designating means designates a position in one zone among the zones into which said window area has been divided.

13. The apparatus according to claim 2, wherein said designating means designates a desired position in said window area by a cursor, the camera moves on the basis of a move indication made by a pointing device, and a speed at which the camera moves is set based upon a relationship between first and second positions designated by said designating means.

14. The apparatus according to claim 13, wherein speed at which the camera moves is set in proportion to a ratio of a first distance between the first position designated by said designating means and a prescribed position to a second distance between the second position designated by said designating means and the prescribed position.

15. The apparatus according to claim 2, further comprising means for displaying an image captured by said camera moved by said moving means.

16. A network system having a plurality of the apparatuses for controlling cameras as set forth in claim 1, wherein said plurality of camera control apparatuses are connected via a prescribed network, and said moving means of a first apparatus for controlling a camera, from among said plurality of apparatuses for controlling cameras, moves a camera connected to a second apparatus for controlling this camera.

17. The apparatus according to claim 1, wherein said image display area of said display means is a screen in a viewfinder of said camera.

18. The apparatus according to claim 19, wherein said designating means detects line of sight directed toward the viewfinder and designates a position at which the line of sight and the screen of said viewfinder intersect.

19. The apparatus according to claim 1, further comprising an invisible border line between the zones.

20. The apparatus according to claim 1, wherein each zone is assigned with a moving direction which corresponds to a direction from center of the image display area to the zone.

21. A method of controlling a camera capable of being moved in prescribed directions that differ from one another, comprising:
   a display step of displaying an image, which has been picked up by the camera, on display means;
   said display means being divided into a plurality of zones, each of said zones displaying a partial image of the image picked up by the camera, and each of said zones being assigned with a direction of movement of the camera;
   a designating step of designating a desired position in the image displayed by said display means, by an operation of a mouse; and
   a moving step of moving the camera in the direction of movement that has been assigned to the zone corresponding to the position designated at said designating step,
   wherein in said moving step, a panning operation of the camera for a time proportional to a period while a button of the mouse is pressed is controlled.

22. The apparatus for performing the method of claim 21, wherein the image picked-up by the camera is displayed in a window area on a display screen.

23. The method according to claim 22, wherein said window area is divided into a plurality of zones and directions of upward movement, downward movement, leftward movement and rightward movement are assigned to respective ones of the zones.

24. A method according to claim 22, wherein the direction of leftward movement is assigned to a zone on the left side of said window area, the direction of rightward movement is assigned to a zone on the right side of said window area, the direction of upward movement is assigned to a zone on the upper side of said window area, and the direction of downward movement is assigned to a zone on the lower side of said window area.

25. The method according to claim 22, wherein speed at which the camera moves is set based upon a relationship between first and second positions designated at said designating step.

26. The method according to claim 22, wherein a zone for designating zooming of the image is further assigned to said window area.

27. The method according to claim 26, wherein a zone for designating zooming of the image is assigned to a central zone of said window area.

28. The method according to claim 26, wherein speed at which the camera moves is set in proportion to a ratio of a first distance between the first position designated at said designating step and a prescribed position to a second distance between the second position designated at said designating step and the prescribed position.

29. The method according to claim 26, wherein said moving step zooms the camera if the zone for designating zooming of the image is designated at said designating step.

30. The apparatus according to claim 22, wherein said window area is divided into a plurality of zones and directions of upward movement, downward movement, leftward movement, rightward movement, upper leftward movement, lower leftward movement, upper rightward movement and lower rightward movement are assigned to respective ones of the zones.

31. The method according to claim 30, wherein a zone for designating zooming of the image is further assigned to a said window area.

32. The method according to claim 31, wherein the direction of leftward movement is assigned to a zone on the left side of said window area, the direction of rightward movement is assigned to a zone on the right side of said window area, the direction of upward movement is assigned to a zone on the upper side of said window area, the direction of downward movement is assigned to a zone on the lower side of said window area, the direction of upper leftward movement is assigned to a zone on the upper left side of said window area, the direction of lower left movement is assigned to a zone on the lower left side of said window area, the direction of upper rightward movement is assigned to a zone on the upper right side of said window area, and the direction of lower rightward movement is assigned to a zone on the lower right side of said window area.

33. The method according to claim 31, wherein a zone for designating zooming of the image is assigned to a central zone of said window area.

34. The method according to claim 22, wherein said designating step designates a position in one zone among the zones into which said window area has been divided.

35. The method according to claim 22, further comprising a step for displaying an image captured by said camera moved at said moving step.

36. The method according to claim 21, wherein the display screen area of said display means is a screen in a viewfinder of said camera.

37. The method according to claim 36, wherein said designating step detects line of sight directed toward the viewfinder and designates a position at which the line of sight and the screen of said viewfinder intersect.

38. The apparatus according to claim 21, further comprising an invisible border line between the zones.

39. The method according to claim 21, wherein each zone is assigned with a moving direction which corresponds to a direction from center of the image display area to the zone.

40. An apparatus for controlling a camera capable of being moved in prescribed directions that differ from one another, comprising:
   display means for displaying an image picked up by the camera in an image display area;
   assigning means for dividing the image display area into a plurality of zones and for assigning each of the zones with a direction of movement of the camera different from each other;

detecting means for detecting a position designated by an operation of a mouse;

determination means for determining which zone is designated on the basis of the position detected by said detection means; and moving means for moving the camera in the direction of movement assigned to a zone determined by said determination means, wherein said moving means controls a panning operation of the camera for a time proportional to a period while a button of the mouse is pressed.

41. The apparatus according to claim 40, further comprising an invisible border line between the zones.

42. The apparatus according to claim 40, wherein each zone is assigned with a moving direction which corresponds to a direction from center of the image area to the zone.

43. A method of controlling a camera capable of being moved in prescribed directions that differ from one another, comprising:

a display step of displaying an image picked up by the camera in an image display area;

an assigning step of dividing the image display area into a plurality of zones and of assigning each of the zones with a direction of movement of the camera different from each other;

a detecting step of detecting a position designated by an operation of a mouse;

a determining step of determining which zone is designated on the basis of the position detected in said detection step; and a moving step of moving the camera in the direction of movement assigned to a zone determined in said determination step, wherein in said moving step, a panning operation of the camera for a time proportional to a period while a button of the mouse is pressed is controlled.

44. The method according to claim 43, wherein border lines of the plurality of zones are invisible.

45. The method according to claim 43, wherein each zone is assigned with a moving direction which corresponds to a direction from center of the image display area to the zone.

46. An apparatus for controlling a camera capable of being moved in prescribed directions that differ from one another, comprising:

display means for displaying an image picked up by the camera, the displayed image being divided into a plurality of zones, each of said zones displaying a partial image of the image picked up by the camera, and each of said zones being assigned a direction of movement of the camera;

designating means for designating a desired position in said image display area; and moving means for moving the camera in the direction of movement that has been assigned to the zone corresponding to the position designated by said designating means, wherein said moving means moves the camera by an amount of a movement of the camera in proportion to an operation time of said designating means, which is different from an operation time of the movement of the camera by said moving means.

47. A method of controlling a camera capable of being moved in prescribed directions that differ from one another, comprising the steps of:

displaying an image picked up by the camera, the displayed image being divided into a plurailty of zones, each of said zones displaying a partial image of the image picked up by the camera, and each of said zones being assigned a direction of movement of the camera;

designating a desired position in said image display area; and moving the camera in the direction of movement that has been assigned to the zone corresponding to the position designated in said designating step, wherein, in said moving step, the camera is controlled so as to move by an amount of a movement of the camera in proportion to an operation time in said designating step, which is different from an operation time of the movement of the camera in said moving step.

48. An apparatus for controlling a direction of an image pickup apparatus, comprising:

display control unit for displaying an image, in a predetermined area on a display screen, picked-up by said image pickup apparatus, said predetermined area being divided into a plurality of zones, each of said zones displaying a partial image of the image picked up by said image pickup apparatus, and each of said zones being assigned a direction of a movement of a camera; and output unit for outputting a control command for controlling said image pickup apparatus in the direction of the movement that is assigned to the zone corresponding to a position designated by a user;

wherein an amount of the movement of said image pickup apparatus is in proportion to an operation time by the user.

49. The apparatus according to claim 48, wherein the image is displayed on a window area of the display screen.

50. The apparatus according to claim 49, wherein a direction of leftward movement is assigned to a zone on a left side of the displayed image, a direction of rightward movement is assigned to a zone on a right side of the displayed image, a direction of upward movement is assigned to a zone on an upper side of the displayed image, and a direction of downward movement is assigned to a zone on a lower side of the displayed image.

51. The apparatus according to claim 49, wherein said pointing device comprises a mouse.

52. The apparatus according to claim 48, wherein a zone for designating zooming of said image pickup apparatus is further assigned.

53. The apparatus according to claim 48, wherein a zone for designating zooming of the image is assigned to a central zone of the displayed image.

54. The apparatus according to claim 48, wherein a direction of leftward movement is assigned to a zone on a left side of the displayed image, a direction of rightward movement is assigned to a zone on a right side of the displayed image, a direction of upward movement is assigned to a zone on an upper side of the displayed image, a direction of downward movement is assigned to a zone on a lower side of the displayed image, a direction of upper leftward movement is assigned to a zone on an upper left side of the displayed image, a direction of lower leftward movement is assigned to a zone on a lower left side of the displayed image, a direction of upper rightward movement is assigned to a zone on an upper right side of the displayed image, and a direction of lower rightward movement is assigned to a zone on a lower right side of the displayed image.

55. The apparatus according to claim 48, wherein the first position is designated by using a pointing decive.

56. The apparatus according to claim 48, wherein a speed at which said image pickup apparatus is set is based upon a relationship between the position designated by the user and an other position predetermined on said predetermined area.

57. A method for controlling a direction of an image pickup apparatus, comprising the steps of:

displaying an image, in a predetermined area on a display screen, picked-up by said image pickup apparatus, said predetermined area being divided into a plurality of zones, each of said zones displaying a partial image of the image picked up by said image pickup apparatus, and each of said zones being assigned a direction of a movement of a camera; and outputting a control command for controlling said image pickup apparatus in the direction of the movement that is assigned to the zone corresponding to a position designated by a user;

wherein an amount of the movement of said image pickup apparatus is in proportion to an operation time by the user.

58. The method of claim 57, wherein the image is displayed on a window area of the display screen.

59. The method according to claim 58, wherein said pointing device comprises a mouse.

60. The method according to claim 57, wherein a zone for designating zooming of said image pickup apparatus is further assigned.

61. The method according to claim 60, wherein a zone for designating zooming of the image is assigned to a central zone of the displayed image.

62. The method according to claim 58, wherein a direction of leftward movement is assigned to a zone on a left side of the displayed image, a direction of rightward movement is assigned to a zone on a right side of the displayed image, a direction of upward movement is assigned to a zone on an upper side of, the displayed image and a direction of downward movement is assigned to a zone on a lower side of the displayed image.

63. The method according to claim 57, wherein a direction of leftward movement is assigned to a zone on a left side of the displayed image, a direction of rightward movement is assigned to a zone on a right side of the displayed image, a direction of upward movement is assigned to a zone on an upper side of the displayed image, a direction of downward movement is assigned to a zone on a lower side of the displayed image, a direction of upper leftward movement is assigned to a zone on an upper left side of the displayed image, a direction of lower leftward movement is assigned to a zone on a lower left side of the displayed image, a direction of upper rightward movement is assigned to a zone on an upper right side of the displayed image, and a direction of lower rightward movement is assigned to a zone on a lower right side of the displayed image.

64. The method according to claim 57, wherein the first position is designated by using a pointing device. mouse.

65. The method according to claim 57, wherein a speed at which said image pickup apparatus is set is based upon a relationship between the position designated by the user and an other position predetermined on said predetermined area.

* * * * *

UNITED STATES PATENT AND TRADEMARK OFFICE
CERTIFICATE OF CORRECTION

PATENT NO. : 6,400,401 B1
DATED : June 4, 2002
INVENTOR(S) : Morino et al.

It is certified that error appears in the above-identified patent and that said Letters Patent is hereby corrected as shown below:

<u>Column 8,</u>
Line 22, "is designating by" should read -- is designated by --
Line 43, "of the lower left" should read -- of lower left --

<u>Column 9,</u>
Line 14, should recite dependency from Claim 17.
Line 53, should recite dependency from Claim 23.
Line 61, should recite dependency from Claim 23.

<u>Column 10,</u>
Lines 21-22, "to a said window" should read -- to said window --

<u>Column 11,</u>
Line 16, "image area" should read -- image display area --
Line 63, "method of controlling" should read -- method for controlling --

<u>Column 12,</u>
Line 67, "decive." should read -- device. --

<u>Column 13,</u>
Line 21, "of claim 57," should read -- according to claim 57, --

<u>Column 14,</u>
Line 25, "pointing device.mouse." should read -- pointing device. --

Signed and Sealed this

Eleventh Day of March, 2003

JAMES E. ROGAN
*Director of the United States Patent and Trademark Office*